United States Patent [19]

Marold et al.

[11] Patent Number: 4,957,724

[45] Date of Patent: Sep. 18, 1990

[54] PROCESS AND REACTOR FOR CATALYTIC REACTION OF $H_2S$ AND $SO_2$ TO SULFUR

[75] Inventors: Freimut Marold, Neubiberg; Michael Heisel, Pullach, both of Fed. Rep. of Germany

[73] Assignee: Linde Aktiengesellschaft, Wiesbaden, Fed. Rep. of Germany

[21] Appl. No.: 171,348

[22] Filed: Mar. 21, 1988

[30] Foreign Application Priority Data

Mar. 19, 1987 [DE] Fed. Rep. of Germany ....... 3709031
Mar. 19, 1987 [DE] Fed. Rep. of Germany ....... 3709048

[51] Int. Cl.$^5$ .......................... C01B 17/06; G05D 7/00
[52] U.S. Cl. ................................ 423/574 R; 422/115; 422/200
[58] Field of Search ............... 422/115, 171, 173, 200, 422/201; 423/574 R, 576

[56] References Cited

U.S. PATENT DOCUMENTS

| | | | |
|---|---|---|---|
| Re. 28,830 | 5/1976 | Hunt, Jr. et al. | 423/574 R |
| 2,742,347 | 4/1956 | Carlson | 423/576 |
| 2,898,202 | 8/1959 | Houdry et al. | 422/115 |
| 4,180,554 | 12/1979 | Goddin, Jr. et al. | 423/574 R |
| 4,315,904 | 2/1982 | Lell et al. | 423/574 R |
| 4,507,274 | 3/1985 | Broecker et al. | 423/574 R |

FOREIGN PATENT DOCUMENTS

| | | | |
|---|---|---|---|
| 27329 | 4/1981 | European Pat. Off. | 422/200 |
| 78690 | 5/1983 | European Pat. Off. | |
| 134593 | 7/1983 | European Pat. Off. | |
| 1178046 | 5/1965 | Fed. Rep. of Germany. | |
| 3403651 | 8/1985 | Fed. Rep. of Germany | 423/574 R |
| 3428452 | 8/1985 | Fed. Rep. of Germany | 423/574 R |
| 717482 | 10/1959 | United Kingdom | 423/576 |

OTHER PUBLICATIONS

Coward et al., "Improving Sulfur Recovery at Ram River," *Oil & Gas Journal*, Aug. 29, 1983, pp. 54–56.
Heigold et al., "Pine River Uses Four-Converter MCRC," *Oil & Gas Journal*, Sep. 12, 1983, pp. 156–160.

Primary Examiner—Jeffrey E. Russel
Attorney, Agent, or Firm—Millen, White & Zelano

[57] ABSTRACT

A process and apparatus for conducting a catalytic reaction of $H_2S$ and $SO_2$ to elementary sulfur provides for at least two catalyst beds and that at least one part of one of the catalyst beds is operated during the reaction at below the sulfur dew point, preferably below the solids condensation point, and above the water dew point. The adsorbed and deposited sulfur is removed by heating and evaporation. At least two serially connected and interchangeable reactors are employed in preferably a single flow direction in one cycle, and the flow direction of the gas stream is reversed in a second cycle by means of a multiway fitting.

22 Claims, 4 Drawing Sheets

PROCESS AND REACTOR FOR CATALYTIC REACTION OF H2S AND SO2 TO SULFUR

BACKGROUND

The invention relates to a process as well as apparatus for the catalytic reaction of $H_2S$ and $SO_2$ to elementary sulfur, and especially to an improvement to a plant containing at least two catalyst beds, at least one of said catalyst beds being used for reaction of the sulfur compounds and adsorption of resultant sulfur and operated below the sulfur dew point, and at least one other catalyst bed being regenerated. In general, the resulting sulfur vapor obtained during regeneration is condensed by cooling.

In the processing of crude gas streams which contain sulfur in some form, a separation step is generally required to remove sulfur compounds, e.g., $H_2S$ and $SO_2$; otherwise, in most instances, the gas streams cannot be released into the environment or utilized commercially. Since many fossil fuels contain sulfur in bonded form, gas desulfurization is becoming increasingly important. The separation can be conducted in different ways, for example, adsorptively or catalytically or by physical or chemical scrubbing.

A suitable process is selected depending on the required degree of desulfurization and form of the conversion product of the sulfur.

A known process, in which $H_2S$ and $SO_2$ are converted to elementary sulfur, with a desulfurization efficiency of over 99% being assured, is, for example, a Claus process with four serially connected catalytic reactors, with the last two being operated below the sulfur dew point. As a consequence, the chemical equilibrium is shifted more strongly in the direction of reaction of $H_2S$ and $SO_2$ to elementary sulfur than in a conventional Claus process in which temperatures are not permitted to fall below the sulfur dew point in any of the catalytic reactors.

The reason for this is that a major part of the formed sulfur is removed from the stream by adsorption on the catalyst and thus the equilibrium of the reaction

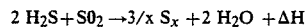

$$2\ H_2S + SO_2 \rightarrow 3/x\ S_x + 2\ H_2O + \Delta H$$

is shifted by the sulfur elimination to the right side of the equation.

The catalyst is inactivated by the sulfur condensation so that it must be regenerated after a certain time. To maintain a continuous operation of the plant, of the four reactors the first is always operated as a conventional Claus reactor, one is regenerated, while the other two are run below the sulfur dew point. For regeneration, the gas stream, for example, is heated up by means of gas-gas heat exchangers so that by passing the heated gas over the catalyst loaded with sulfur, the sulfur is evaporated.

If the sulfur loading of the catalyst reaches a certain level, an automatic switching of the reactor to the regeneration phase and a corresponding switching of the two reactors working below the sulfur dew point take place.

Such a process is described, for example, in Oil & Gas Journal of Sept. 12, 1983, on pages 156-160.

The known process has the great cost disadvantage that at least four Claus reactors, of which two in each case are operated below the S dew point, are necessary to achieve an S recovery of over 99%. (Conversely, when fewer than four Claus reactors are used in other processes, additional measures must be taken, for example, $SO_2$ recycling, in order to meet increasingly stringent emission requirements.) Moreover, the known process has the further disadvantage that many valves and pipes are necessary for operation of the plant with on-line regeneration. In this connection, problems occur, especially with the valves caused by corrosion and faulty sealing (they must be gas-tight). Moreover, it is necessary to heat the valves so that the sulfur, which is contained in the gas stream, will not condense out. Further, even very slight impurities of the gas stream with solid particles, such as, for example, dust, can result in the loss of sealing of the valves.

Since the gas stream from the conventional Claus reactor usually is under a very low pressure, the gas stream has a correspondingly large volume, which, in turn, requires correspondingly large valves.

Thus, there result high wear costs, high assembly expenditures, high proneness to failure and a large space requirement for the plant. These factors lead, on the whole, to relatively high investment and operating costs.

SUMMARY OF THE INVENTION

Therefore, an object of one aspect of the invention is to provide an improved process for catalytic reaction of $H_2S$ and $SO_2$ to elementary sulfur for sulfur recovery of over 99.0%. An object of another aspect of the invention is to provide an apparatus to conduct the improved process. Upon further study, other objects will become apparent.

The object of the process aspect of the invention is attained in a process comprising catalytically reacting gaseous $H_2S$ with gaseous $SO_2$ to elementary sulfur, wherein during one cycle at least one catalyst bed for conducting the reaction and adsorbing sulfur is operated below the sulfur dew point and at least one other catalyst bed is regenerated to remove the deposited sulfur in the vapor phase, wherein an improvement in this system comprises the use of at least two catalyst beds. Another improvement comprises conducting the reaction in at least a part of at least one catalyst bed below the sulfur solids condensation point. In practice, the solids condensation point for monoclinic sulfur is about 119-114.5° C.

The $SO_2 + H_2S$ reaction is mostly carried out as a heterogeneous catalytic reaction conducted in the gas phase in contact with a porous solid catalyst with the lower limit generally being defined by water condensation in the catalyst pores. In practice, water condensation in the catalyst pores generally starts at a temperature 20° C. above the water dew point in the gas phase. This, however, is just a rule of thumb. Thus, for example, a Claus tail gas from a 90 vol% $H_2S$ feed to the Claus unit, the water dew point is approximately 70° C. Consequently, the adsorption reactor can be cooled to approximately 70 +20 =90° C. In general, because it is desirable to use as low a temperature as possible to maximize sulfur recovery and in turn minimize the residual sulfur vapor pressure, the preferred reaction temperature is about 10 to 20° C. higher than the water dew point in the reactor.

Heretofore, it was not commercially feasible in a continuously operating plant to lower the temperature and sulfur vapor pressure further than just above the sulfur solids condensation point, since in present plants where the reactors are operated adiabatically there is no reasonable possibility of removing the solidified sulfur if it blocks the gas stream. It is a well known fact that adiabatic catalytic reactors, which are operated below the sulfur dew point, tend to clog from the outside inward. This is due to heat losses through the insulation of the reactor, so that from the outside inward sulfur cools below the solids condensation point, subsequently clogging these cold sections. As the gas flow through these sections decreases, heat transfer from both the Claus reaction and the incoming gas is reduced, thus favoring further sulfur freezing and clogging. This effect continues until only a small cross section remains open, where the heat of the reaction and transfer of heat from the gas keep the catalyst above sulfur solidification.

In the free cross section remaining inside, increasingly less reaction then takes place, since the residence time of the gas inside decreases the further the reaction freezes up; for with the same throughput and narrowing cross section surface the gas velocity increases considerably. In this connection, it is also a disadvantage that solid sulfur is a very good insulating material so that the heat dissipation drastically worsens, which renders it almost impossible to regenerate the clogged sections of the reactor from frozen sulfur. "Frozen" reactors have to be emptied and refilled with new catalyst.

To avoid the problems described above, it is provided according to the apparatus aspect of the invention that the catalyst beds be integrated within internally cooled or heated reactors.

Thus, it is possible merely by using an internally heated reactor to heat the catalyst bed directly and thus to prevent an irreversible blocking or inactivation of the catalyst bed.

The additional energy for the process according to the invention for maintaining the low reaction temperature or for liquefaction of the sulfur on the catalyst can be provided without any problem, for example, by means of boiler feed water or high-pressure steam.

In general, more than 99.5% of the sulfur can be advantageously recovered from Claus gases having $H_2S$ concentrations of about 30 to 90% by volume of $H_2S$ on the basis of the process according to the invention, without additional separate purification steps being necessary. This permits a substantial reduction of the investment costs and space requirements of the plant in comparison with known processes.

According to a modification of the process aspect of this invention, it is advisable to operate a part of each catalyst bed at temperatures above the sulfur solids condensation point. At that higher temperature, the catalyst is more active, thus increasing sulfur recovery which approaches thermodynamic equilibrium. The sulfur formed is then adsorbed in the cooled section of the reactor. Typically, 20 to 50% of the catalyst bed is kept above the sulfur solids condensation point.

It is generally preferable to let at least two reactors operate behind one another in the direction of the stream. As a result, a regeneration of the catalyst beds during normal operation is possible, namely without a connection of a special regeneration circuit and without rerouting the gas stream over other catalyst beds and external heat exchangers.

Further, it is advantageous that the entire gas stream generally at a temperature of 250 to 350° C. downstream of the Claus furnace and waste heat boiler be used for regeneration, as a result of which it is further desulfurized, since the catalyst beds, even with close to complete loading, are still active for the Claus reaction.

Thus, it is possible to reduce the number of necessary valves and pipes, which preferably can be achieved only by reversal of the flow direction. According to the process according to the invention, at least one multiway fitting, e.g., a four-way valve, is used for this purpose.

In comparison with the usual control valves, the multiway fittings offer the advantage that they always operate in live lines, which are hot due to the continuous gas flow through them. Therefore, these valves do not necessarily have to be heated and are insensitive to the impurities of the gas stream. Besides, they are easier to control and simpler to service.

According to the invention, the entering gas preferably flows through the reactors in the same direction both during regeneration and during adsorption Thus, as slight a stress or wear of the catalyst as possible is achieved. On the other hand, in some cases, it is advisable that the reactors during the regeneration and adsorption be flowed through in opposite directions. In this way, the catalyst bed stress is somewhat increased but substantially fewer pipes are necessary for this purpose.

It is especially favorable if the catalyst beds are cooled during the catalytic reaction or heated during the regeneration by means of a heat transfer medium, which means that nonadiabatic reactors are involved. In this case, boiler feed water or steam is advantageously used as heat transfer medium, since these fluids are generally available or inexpensive to provide. Moreover, the performance of the nonadiabatic reaction increases the reaction of $H_2S$ and $SO_2$ to elementary sulfur. Also, the often necessary hydrolysis of $COS/CS_2$ to $H_2S$ can take place in an adiabatic preliminary bed in the same reactor.

To reduce further the proneness of the plant to failure and the number of moving parts it is particularly advisable to use only one multiway fitting for switching of the flow direction and to connect a sulfur condenser downstream from each catalyst bed.

Heretofore, it has been conventional to separate the sulfur, which leaves the reactor in gaseous form, in a downstream condenser. According to another configuration of the invention, by another multiway fitting being installed between a first reactor and the downstream sulfur condenser, a common sulfur condenser can be used for each two reactors. This means that the installed sulfur condenser is always flowed through in the same direction regardless of the position of the reactors.

In a further development of the process, a gas containing $O_2$ is added to the gas stream before flowing through the first multiway fitting, as a result of which crude gas streams with a low $H_2S$ content, for example, less than 20% by volume of $H_2S$, and with a low content of other components such as, e.g., HCN, $NH_3$ and hydrocarbons can be used. In this case, the added gas containing $O_2$, for example, air, makes possible the direct oxidation of $H_2S$ in the first reactor.

Further, gas containing $O_2$ can advantageously be added before the last reactor, preferably before the sulfur condensation. On the basis of this fine $O_2$ metering, the direct oxidation of $H_2S$ and $SO_2$ to elementary sulfur can be optimized, so that a maximum sulfur recovery of over 99% can be achieved. Generally, the amount of oxygen added prior to the last reactor is in the range of 0.01 to 0.5 vol% of the gas fed to the reactor. When applying direct catalytic oxidation of $H_2S$, the process according to the invention is particularly suitable for processing gas streams that consist of less than 20% by volume of $H_2S$.

Further, it is particularly advantageous if one or more Claus reactors and sulfur condensers are upstream from the first multiway fitting. In this connection, both conventional Claus reactors and nonadiabatic reactors can be used. The reactors downstream from the first multiway fitting preferably operate, according to the invention, at least partially below the sulfur solids condensation point to increase the sulfur recovery and thus reduce residual sulfur and sulfur compounds. Thus, such a process can also be used for treatment of Claus tail gas, with which a subsequent incineration can be performed optionally at lower temperatures.

For the process according to the invention, it is recommended that a catalyst, which makes possible the direct oxidation of $H_2S$ to $SO_2$ and/or S, be used, so that in the reactor both the $H_2S$ oxidation and Claus reaction take place. Preferred catalysts consist mainly of $TiO_2$. Other components of the catalyst could be $Al_2O_3$, alkaline earths or elements of groups IIIb or IVb of the periodic table of elements. Such catalysts are described, e.g., in the specifications of EP 0 134 593, EP 0 078 690, DE 11 78 046 and U.S. Pat. No. 4,507,274.

In this connection, on the basis of the cyclic mode of operation, it is necessary that all catalyst beds be of the same composition and design. Especially also from the aspect that it is possible to divide the catalyst bed and to introduce in an adiabatic preliminary bed a catalyst which assures the hydrolysis of possibly present COS or $CS_2$ to $H_2S$. A catalyst based on $TiO_2$ is used, for example, for the hydrolysis. (See, e.g., Oil & Gas Journal, Aug. 29, 1983, pp. 54–56.)

The invention further relates to a reactor for performing the process with at least one catalyst bed, and at least one heat exchanger coil is placed in the catalyst beds.

To obtain satisfactory heat transfer and/or uniform heating of the reactor, it is especially advantageous to use several bundles of cooling or heating coils, which are placed in spirals or coils in a plane.

According to a modification of the apparatus aspect, the system contains at least two reactors, in which are installed one or more catalyst beds, a crude gas pipe and at least one multiway fitting, in which the multiway fitting is installed in the crude gas pipe before the first catalyst bed so that in each case the entire gas stream can be cyclically reversed. In this way, substantially fewer pipes are necessary and also no circulating blower is necessary. Further, the number of external heat exchangers is optionally reduced to zero—for example, by use of nonadiabatic reactors.

On the whole, the invention offers substantial economic and technical advantages in comparison with known processes. The investment for equipment is substantially less and the operation of the plant, especially the controllability thereof, in comparison with prior processes is simplified and less susceptible to failure, resulting in an overall improved efficiency of the plant. Moreover, the invention permits the catalyst to be more highly loaded with sulfur. Furthermore, on the basis of the direct heating of the inactivated catalyst bed, the regeneration times are shortened, as a result of which less catalyst per reactor is necessary, which results in a further cost saving.

The invention can be used wherever an improvement in sulfur recovery from acid gases is to be achieved, especially for improving sulfur recovery from Claus process gases and Claus tail gases.

The entire text of all applications, patents and publications, if any, cited above and below are hereby incorporated by reference.

DETAILED DESCRIPTION OF THE DRAWINGS

Figure 1:
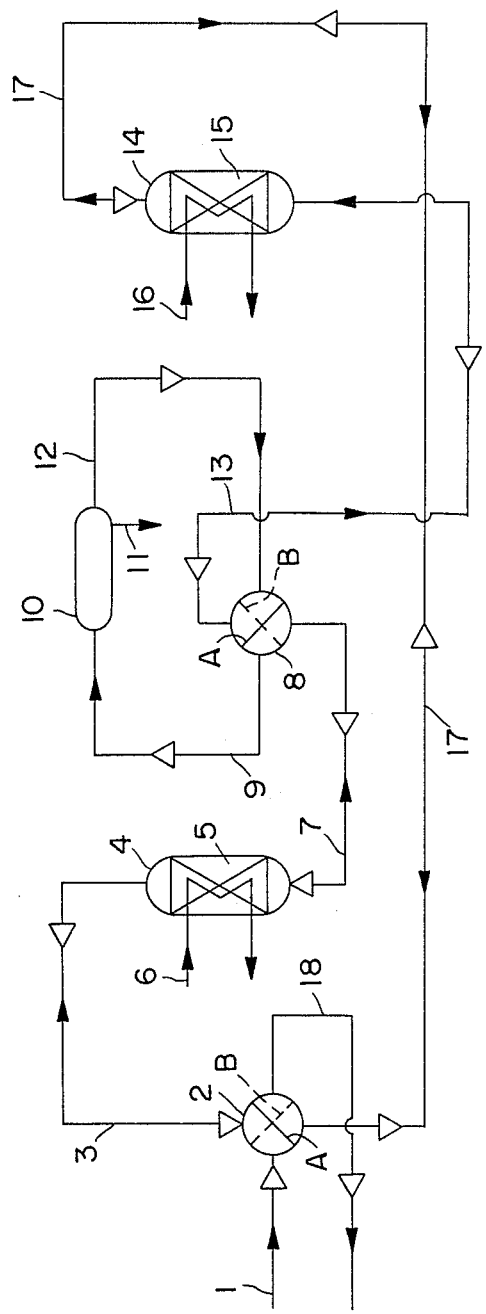
FIG. 1 is a schematic illustration of a comprehensive embodiment of the invention wherein the gas flows through the reactors in the opposite direction, i.e., the first from top to bottom and the second from bottom to top.

Referring now to the black arrowheads in FIG. 1, a crude gas, which, for example, contains $H_2S$ and $SO_2$ in a ratio of about 2 to 1 and at an $H_2S$ concentration of about 5.2% and, for example, coming from a Claus burner is fed by pipe 1 to a multiway fitting 2 (flap in position A). The crude gas is introduced into reactor 4 by pipe 3. In reactor 4 is installed a catalyst bed 5, which has been loaded with sulfur in a preceding cycle 1.

High-pressure steam, for example, at a pressure of 40 bars and a temperature of 250° C., is passed into heat exchange coils 6, which are embedded in catalyst bed 5, in order to heat the catalyst bed 5 to a sufficiently high temperature to evaporate the elementary sulfur and reactivate the catalyst. At the same time, reactor 4 operates as a catalytic Claus reactor above the sulfur dew point, thereby lowering the $H_2S$ content to about 1.1% at the outlet of the reactor.

By pipe 7, multiway fitting 8 (flap in position A) and pipe 9 the gas reaches sulfur condenser 10, where liquid sulfur is removed by pipe 11. The gas, substantially freed of sulfur, is then fed by pipe 12 and by multiway fitting 8 (flap in position A), and pipe 13 to reactor 14, which in design, i.e., catalyst bed 15 and cooling/heating coils 16, is identical with reactor 4.

Reactor 14 works below the sulfur solids condensation point, for example, at about 90° C. and thus adsorbs uncondensed sulfur vapor, which is brought in with the gas, as well as the elementary sulfur which is formed in reactor 14. By removal of the sulfur from the gas phase, the chemical equilibrium is shifted in the direction of increased sulfur formation, and in comparison with processes that operate at about 120° C., i.e., below the sulfur dew point but above the solids condensation point, the lower temperature has a favorable effect on increased sulfur removal from the gas.

From reactor 14, the pure gas by pipe 17 and multiway fitting 2 (flap in position A) enters pipe 18 and is withdrawn from the plant.

After the catalyst in reactor 14 is loaded with sulfur, multiway fittings 2 and 8, which are connected to one another, are reversed (flaps in position B).

The reversal of the flow direction produced by the reversal of the fittings (white arrowheads in the figure) causes the crude gas now to enter by multiway fitting 2 (flap in position B) and pipes 17 and 16 first into reactor 14, which was subjected to flow in the opposite direction in the preceding cycle. As a result, reactor 14, as previously described for loaded reactor 4, is regenerated. After leaving reactor 14, the gas, similarly to the previous cycle, is fed to reactor 4, which is now operated below the sulfur solids condensation point The purified gas is withdrawn from the plant by pipe 3, by multiway fitting 2 (flap in position B) and pipe 18.

An $Al_2O_3$-based Claus catalyst is used in the reactors, which, when employed as well in the uncooled top layer of the reactor, is also reasonably active for $COS/CS_2$ hydrolysis.

As the reactor, preferably a vertical vessel with a coiled heat exchanger for internal cooling is utilized (see FIG. 3, described below).

Figure 2:
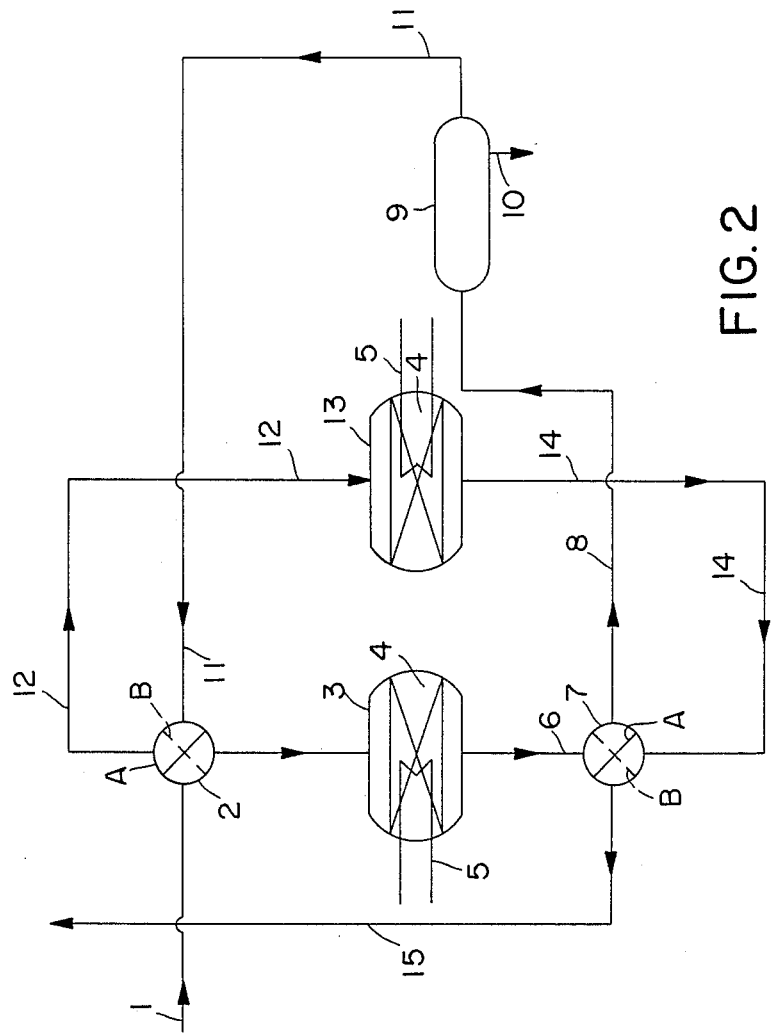
FIG. 2 is a schematic illustration, similar to that of FIG. 1, but where the gas flows through the reactor in the same direction.

FIG. 2 shows a preferred embodiment of the invention, if improved $COS/CS_2$ hydrolysis is required, which necessitates constant flow direction through the reactors. As described previously for $COS/CS_2$ hydrolysis, a special catalyst is preferably used. As this catalyst is unable to adsorb much sulfur, it should not be applied at the cold outlet of the sub dew point reactor, where sulfur condenses. For $COS/CS_2$ hydrolysis, this catalyst of course has to be placed at the inlet of the reactor operated above the sulfur dew point. This means that in both reactors this catalyst must be at the inlet, so that the flow direction during adsorption phase and regeneration phase is the same.

According to FIG. 2, a Claus process gas from a Claus burner is passed by pipe 1 via multiway fitting 2 (flap in position A) into reactor 3 equipped with a catalyst bed 4 and heat exchange coils 5. Catalyst bed 4 has been loaded with sulfur in a previous cycle. The catalyst bed is heated by heat exchange coils 5 to evaporate and separate elementary sulfur, thereby reactivating the catalyst.

Via pipe 6, multiway fitting 7 (flap in position A) and pipe 8, the gas is introduced into a sulfur condenser 9, where liquid sulfur is removed by pipe 10.

Then, the gas, substantially free of sulfur, passed by pipe 11 via multiway fitting 2 (flap in position A) and pipe 12 into reactor 13, which is identical in design with reactor 3. In this connection, it is to be noted that reactors 3 and 13 are both traversed in the same direction.

In this cycle, reactor 13 is operated below the sulfur solids condensation point so that the catalyst loads up with sulfur. In this way, the sulfur present in the gas phase is removed.

The pure gas thus obtained is fed to further processing via pipe 14, multiway fitting 7 (flap in position A) and pipe 15.

When a certain sulfur load of the catalyst in reactor 13 is reached, multiway fittings 2 and 7 are reversed (flaps in position B). As a result, the functions of the reactors are exchanged and thus the Claus process gas then enters first by pipe 12 into reactor 13.

The gas then runs through the same process as described above.

Figure 3:
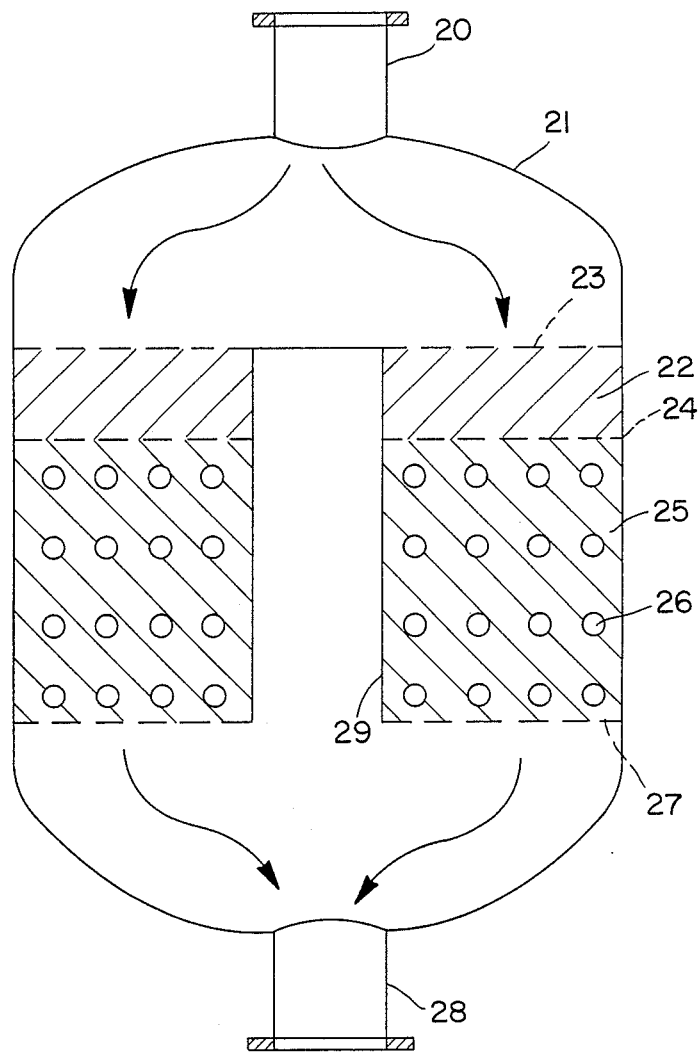
FIG. 3 is a schematic cross section of a preferred reactor.

In FIG. 3, which displays a preferred type of reactor, feed gas, for example from a Claus furnace, is fed via inlet 20 into the reactor 21. The stream then enters the catalyst bed 22, via a grate 23, whose middle part is designed as a round plate impervious to the gas. The catalyst bed is utilized as a pseudo-adiabatic first layer in which hydrolysis of any existing COS or $CS_2$ to $H_2S$ takes place. Via a second grate 24, the gas reaches a second catalyst bed 25, which is heated/cooled internally with heating/cooling coils 26. The entire catalyst layer is held by a further grate 27. After passing through this grate, the gas streams leave as pure gas via outlet 28.

Welded to the gas-impervious plate in grate 23 is a pipe 29 which runs along the entire height of the catalyst bed, thus also being attached to grates 24 and 27.

Figure 4:
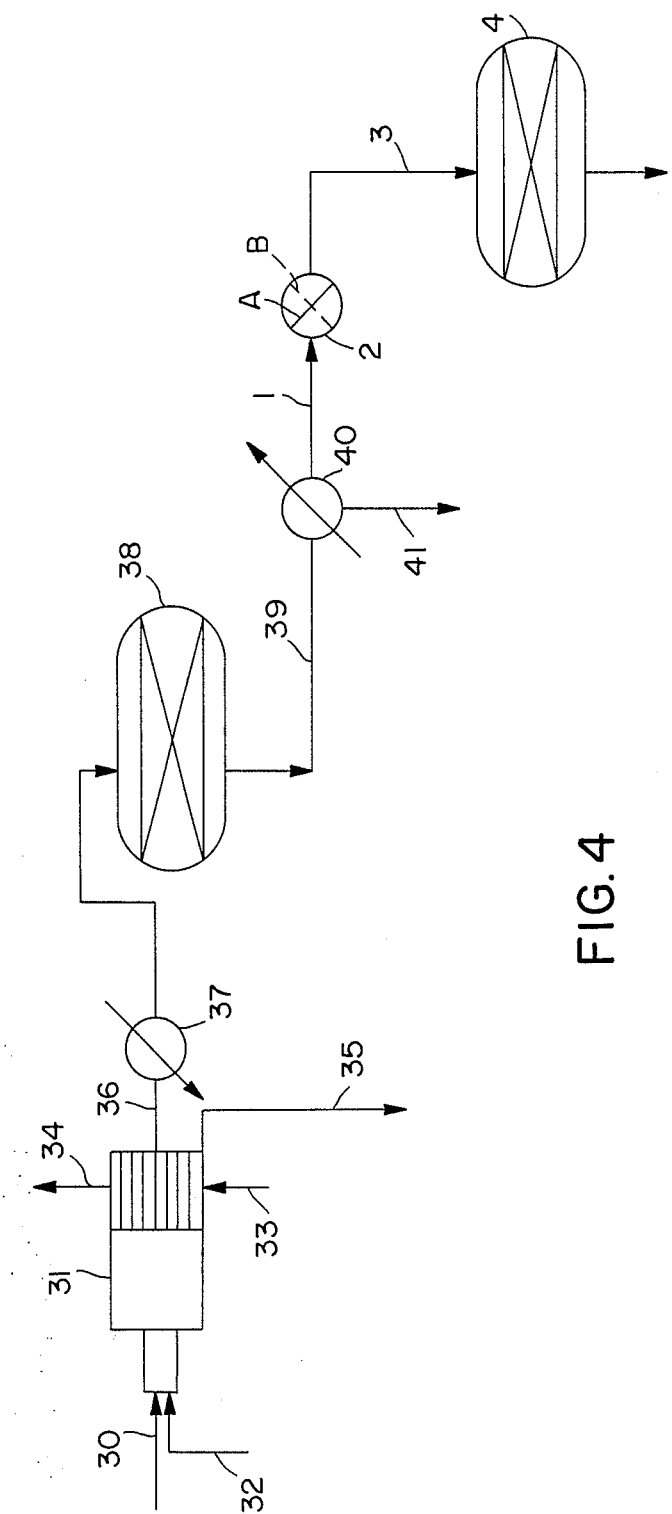
FIG. 4 is a schematic illustration of a comprehensive embodiment of the invention wherein the present invention is combined with an adiabatic catalytic reactor downstream of a conventional Claus plant to treat the tail gas thereof.

In FIG. 4, a Claus feed gas 30 enters the Claus burner 31 equipped with a waste heat boiler and a sulfur condenser, together with air via line 32. Boiler feed water 33 is fed into the waste heat boiler and steam withdrawn via line 34. Product sulfur is obtained from unit 31 via outlet 35.

The Claus tail gas is fed via line 36 into steam reheater 37 and then passed into an adiabatic catalytic reactor 38. The gas withdrawn therefrom is fed via line 39 into a sulfur condenser 40, from which product sulfur is withdrawn via line 41 and then passed via line 1 to the first multiway fitting 2 shown in FIG. 1 and FIG. 2. With the flap in position A, the treated Claus tail gas is introduced into reactor 4 by pipe 3. From there, the process continues as described above in relation to FIGS. 1 or 2.

Whereas the invention has been illustrated by the use of indirect heat exchange means embedded in the catalyst bed, other heat exchange methods, though less advantageous, can also be employed, for example, the introduction of a foreign cold quench gas or foreign heated gas directly into the beds so as to accomplish direct heat exchange with the process stream and deposited sulfur respectively. Alternatively, heat exchangers can be used to heat or cool the $H_2S$-containing streams prior to passing such streams into adiabatic catalyst beds—in combination or not—with indirectly cooled or heated catalyst beds.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalytic sulfur recovery plant comprising two serially connected fixed bed reactors with a sulfur condenser therebetween, each of said reactors having a catalyst bed, a heat exchanger embedded in said catalyst bed, said catalyst bed comprising active catalyst for the direct oxidation of $H_2S$ to sulfur, a first multiway fitting being in communication with and downstream of a crude gas pipe and upstream of said two serially connected reactors, and a second multiway fitting being in communication with said two serially connected reactors and being arranged between them.

2. A plant according to claim 1, wherein both fixed bed reactors have catalyst beds of the same composition and design and the reactors have an adiabatic preliminary bed of a catalyst which effects the hydrolysis of any COS or $CS_2$ to $H_2S$.

3. In a process comprising catalytically reacting in a gas stream gaseous $H_2S$ with gaseous $SO_2$ to elementary sulfur, wherein during one cycle a first fixed catalyst bed for conducting the reaction and adsorbing sulfur is operated below the sulfur dewpoint and another fixed catalyst bed is regenerated to remove the deposited sulfur in the vapor phase, the improvement which comprises using a system provided with only two fixed catalyst beds arranged in reactors with internal indirect heating and cooling means, which are cyclically switched from the reaction to the regeneration mode and vice versa, conducting the reaction between $H_2S$ and $SO_2$ in at least a part of a catalyst bed below the sulfur solids condensation point, thereby adsorbing the formed sulfur in said part of the catalyst bed.

4. A process according to claim 3, further comprising cooling said first fixed catalyst bed in the interior thereof.

5. A process according to claim 3, wherein the catalytic reaction between $H_2S$ and $SO_2$ and the adsorption of sulfur is conducted at a temperature between the sulfur solids condensation point and the water dewpoint.

6. A process according to claim 5, wherein the catalytic reaction between $H_2S$ and $SO_2$ and the adsorption of sulfur is conducted at least about 10° C. above the water dewpoint.

7. A process according to claim 5, wherein the catalytic reaction between $H_2S$ and $SO_2$ and the adsorption of sulfur is conducted at about 20° C. above the water dewpoint.

8. A process according to claim 3, wherein only a part of said catalyst bed is operated at temperatures above the sulfur solids condensation point.

9. A process according to claim 3, wherein the catalyst beds during both regeneration and during reaction/adsorption are traversed in the same direction.

10. A process according to claim 3, wherein the reactors during regeneration and reaction/adsorption are traversed in opposite directions.

11. A process according to claim 3, wherein a multiway fitting is connected upstream of said two catalyst beds so as to effect flow change.

12. A process according to claim 3, wherein said heating or cooling is conducted in indirect heat exchange with a heat transfer medium flowing through the interior of said bed.

13. A process according to claim 3, further comprising condensing the vaporous sulfur in a common sulfur condenser in communication with said two catalyst beds.

14. A process according to claim 3, further comprising adding a gas containing $O_2$ to the gas stream entering one or both of the catalyst beds.

15. A process according to claim 3, where the vaporous sulfur is condensed; and, prior to being condensed, a gas containing $O_2$ is added to said vaporous sulfur.

16. A process according to claim 7, wherein said gas stream comprises less than 20% by volume of $H_2S$.

17. A process according to claim 3, wherein said catalyst beds are operated in series.

18. A process according to claim 14, wherein said gas containing $O_2$ is added to the gas stream employed for regenerating a catalyst bed.

19. A process according to claim 3, wherein said process is used for the treatment of a Claus tail gas.

20. In a process comprising catalytically reacting gaseous $H_2S$ with gaseous $SO_2$ to elementary sulfur, wherein during one cycle, at least one catalyst bed for conducting the reaction and adsorbing sulfur is operated below the sulfur dewpoint, and at least one other catalyst bed is regenerated to remove the deposited sulfur in the vapor phase, the improvement which comprises using a system provided with at least two catalyst beds, wherein the vaporous sulfur is condensed, and, prior to being condensed, a gas containing $O_2$ is added to said vaporous sulfur.

21. In a process comprising catalytically reacting gaseous $H_2S$ with gaseous $SO_2$ to elementary sulfur, wherein during one cycle, at least one catalyst bed for conducting the reaction and adsorbing sulfur is operated below the sulfur dewpoint, and at least one other catalyst bed is regenerated to remove the deposited sulfur in the vapor phase, the improvement which comprises using a system provided with at least two catalyst beds, conducting another cycle and adjusting a multiway fitting connected upstream of said at least two catalyst beds so as to effect flow change, and adding a gas containing $O_2$ to the gas stream entering one or both of the catalyst beds when that gas stream is employed for regenerating a catalyst bed.

22. In a process comprising catalytically reacting $H_2S$ with gaseous $SO_2$ to elementary sulfur, wherein during one cycle, at least one catalyst bed for conducting the reaction and adsorbing sulfur is operated below the sulfur condensation point, and at least one other catalyst bed is regenerated to remove the deposited sulfur in the vapor phase, the improvement which comprises using a system provided with at least two catalyst beds, wherein at least one catalyst bed is cooled in the interior thereof and wherein the vaporous sulfur is condensed, and, prior to being condensed, a gas containing $O_2$ is added to said vaporous sulfur.

* * * * *